Patented June 27, 1933

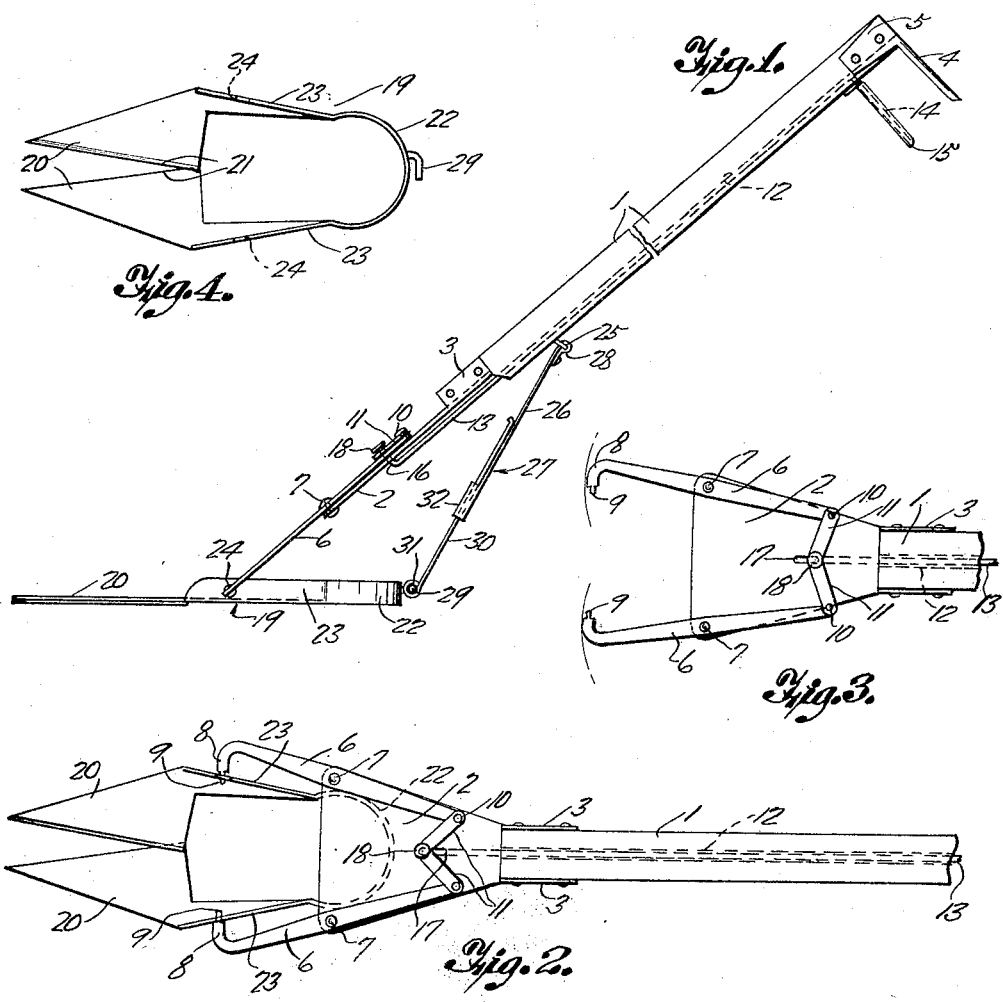

1,915,856

UNITED STATES PATENT OFFICE

OSCAR E. HIMAN, OF DES MOINES, IOWA

GRASS CLIPPERS OR LAWN TRIMMER

Application filed May 4, 1932. Serial No. 609,101.

My invention relates to improvements in grass clippers or lawn trimmers and the main object is to provide a simple and efficient clipper including a handle and shears connected to and operated from the upper end of the handle, the said shears being adjustable to various angles relative to the handle whereby the user may walk upright while trimming the grass either in front or to either side of him.

Another object is to provide a device of this kind in which the shears may be readily detached from the handle and operating mechanism for use in the usual manner.

With these and other objects in view the invention resides in the novel construction and arrangement of parts as hereinafter set forth and claimed, reference being had to the accompanying drawing in which:

Figure 1 is a side view of the clipper.

Figure 2 is a plan view, the handle being swung downward from the position shown in Figure 1.

Figure 3 is a plan view of the clipper operating levers and associated parts.

Figure 4 is a plan view of the clippers alone.

Referring now more particularly to the drawing the reference numeral 1 designates a handle of any desired length to the intended lower end of which is secured a triangular end plate 2 by its spaced ears 3 and to the upper end of which is secured a hand grip 4 and by the spaced ears 5 in the manner shown. Two operating levers 6 are pivoted intermediate their ends at 7 to the lower corners of the end plate 2 and are turned inwardly at their lower ends as at 8 and terminate in lugs or pins 9. The opposite upper ends of the levers 6 are pivotally attached at 10 to the outer ends of a pair of toggle links 11. The handle 1 has a groove 12 cut in its under side from end to end and an operating rod or wire 13 is slidably mounted in this groove and is turned outwardly at its upper end 14 and is secured to a hand piece 15. At its lower end the rod 13 is turned upwardly at 16 and passed loosely through a slot 17 in the plate 2. The inner ends of the toggle links 11 are pivotally attached at 18 to this upturned end of the rod 13 and in normal position these links 11 normally stand in the angular relation shown in Figure 2 and the upturned end of the rod 13 normally rests at the lower end of the slot 17. The arrangement is such that by grasping the hand grip 4 and hand piece 15 and pulling upward on the latter the rod 13 will operate to straighten the toggle links 11 and force the upper ends of the operating levers 6 asunder resulting in an inward movement of the lower ends of the levers as indicated by the arrows in Figure 3.

The clippers indicated generally at 19 are of conventional shape and construction comprising the blades 20 having shearing edges 21 and joined at the back by a spring yoke 22 tensioned to normally move the blades apart as shown in Figure 4. In accordance with my invention the upturned edges 23 of the blades 20 are provided with apertures 24 adapted to receive the pins 9 at the ends of the levers 6 as best shown in Figure 2. The blades 20 are drawn together somewhat until the pins 9 may be inserted in the apertures 24 and the levers 6 and toggle links 11 are so proportioned that the blades cannot return fully to their normal position so that the tension of the spring yoke 22 will serve to hold the parts in their normal position as aforesaid. As the lower ends of the levers 6 are swung inward by operation of the hand piece 15 in the manner set forth the blades 20 of the clippers will be swung together and upon releasing pressure on the hand piece 15 the yoke 22 will again open the blades, these operations being repeated to operate the shears as will be understood.

A staple or eye 25 is secured to the under side of the handle 1 adjacent the lower end thereof and the upper section or bar 26 of a back stay 27 is pivotally attached at its upper end as shown at 28 to this staple. An L-shaped attaching hook 29 is secured to the back of the yoke 22 and the lower section or bar 30 of the back stay 27 is formed at its lower end with an eye 31 to releasably engage the said hook. The lower end of the upper back stay section 26 is formed with laterally extended wings or ears 32 which are bent around the lower section 30 whereby the two sections are held in frictional and slidable relationship.

By adjusting the overall length of the back stay 27 by sliding the two sections together or apart the clippers 19 may be adjusted to and held at any angle relative to the handle as will be understood. Any desired friction device may be incorporated in this back stay 27 to aid in holding the stay in the desired position or a lock screw may be employed to positively lock the two sections in place.

Further details of the construction, operation and utility of my invention will be readily apparent.

While I have herein set forth a certain preferred embodiment of my invention it is understood that I may vary from the same in minor structural details so as best to construct a practical device for the purposes intended, not departing from the spirit of the invention and within the scope of the appended claim.

I claim:

An operating mechanism for a pair of clippers including two blades connected at their rear ends by a spring yoke, the outer margins of the rear portions of the blades being upturned and having laterally aligned apertures therethrough, the said mechanism comprising a handle having a perpendicularly turned hand grip at its intended upper end and groove cut from end to end along its intended lower side and a triangular end plate extended from its narrow end at the intended lower end of the handle, the said plate being slotted longitudinally at its rear end, the arrangement being such that a plane cutting the said plate perpendicularly along its median line would include the axis of the said groove of the handle, a hook secured to the spring yoke of the blades, elongated operating levers pivoted intermediate their ends to transversely opposite points on the end plate, the forward ends of the operating levers being inturned and loosely anchored in the said apertures of the blade margins, toggle links loosely connected to the opposite ends of the operating levers and extending inwardly, an operating rod slidably positioned within the said groove of the handle and having the upper end bent out complementarily to the said hand grip of the handle, the lower end of the rod being bent up through the said slot of the end plate and loosely connected to the inner ends of the said toggle links, and a longitudinally adjustable back stay attached at one end to the handle, the opposite end of the back stay being detachably connected to said hook upon the spring yoke.

In testimony whereof, I affix my signature.

OSCAR E. HIMAN.